Sept. 22, 1959            A. ESCARTIN            2,905,418
HOLDING MEANS FOR MAKING COFFEE, TEA AND THE LIKE
Filed July 13, 1956
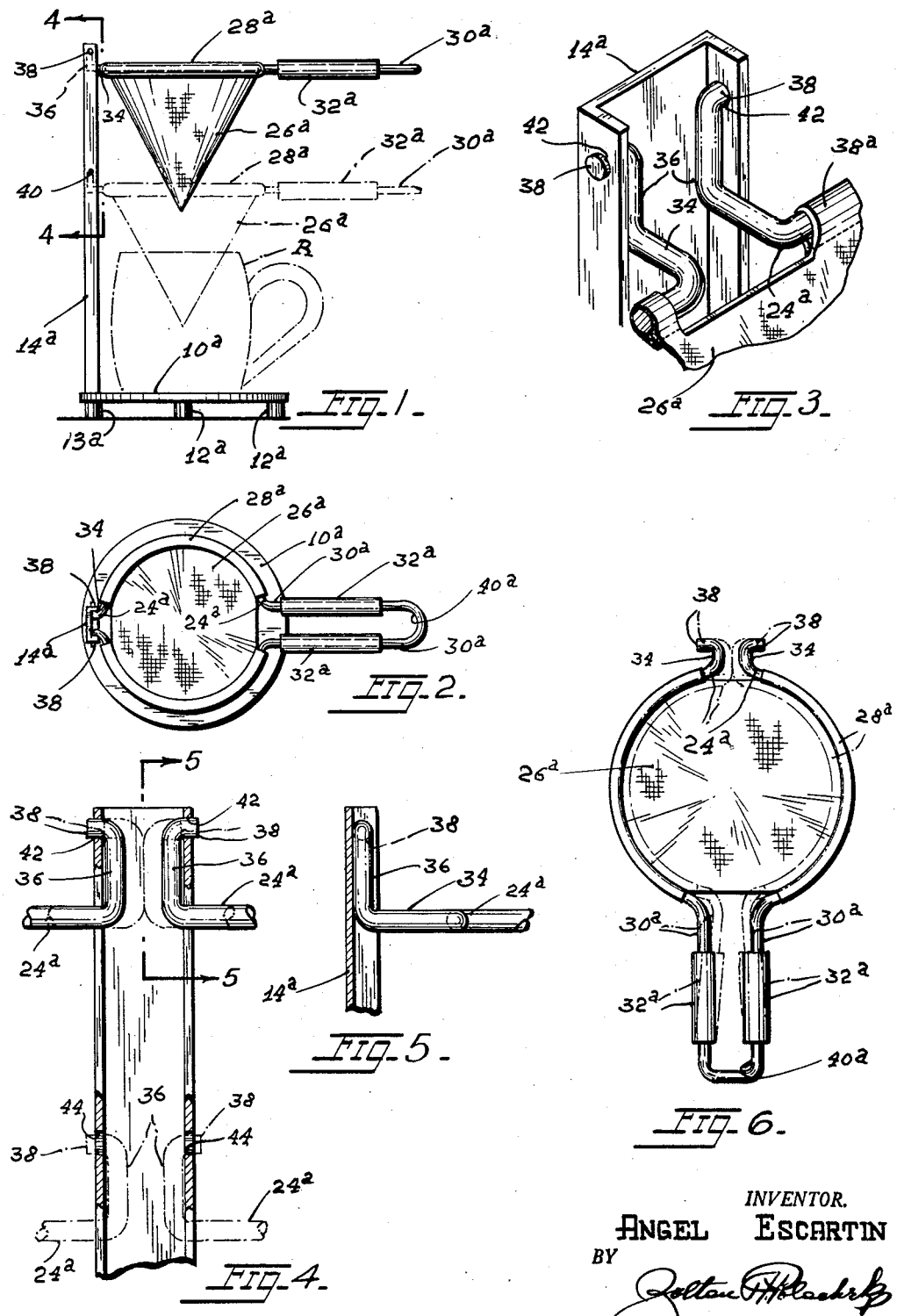
INVENTOR.
ANGEL ESCARTIN
BY
ATTORNEY

2,905,418

HOLDING MEANS FOR MAKING COFFEE, TEA AND THE LIKE

Angel Escartin, Miami, Fla.

Application July 13, 1956, Serial No. 597,706

1 Claim. (Cl. 248—94)

This invention relates to a device adapted to provide a stand for supporting a receptacle such as a coffee or tea pot, the stand further being designed to support in position above the pot a liquid-pervious bag or filter means that will contain a quantity of ground coffee, or alternatively a quantity of tea leaves so that when hot water is poured into the bag, said water will pass through the material confined within the bag, and will drip into the pot. Thus, hot coffee or tea is prepared by an infusion method, so as to be swiftly and easily prepared, while still having a particularly fine flavor.

One object of the invention is to provide a device of the character described that will be inexpensively constructed, and will facilitate the making of coffee or tea in a manner that will permit easy disposal of the coffee grounds or tea leaves.

Another object is to so design the stand and filter that there will be no possibility of the grounds or leaves becoming intermixed with the prepared beverage.

A further object is to provide a simple designed assembly of the type described that will eliminate the need for expensive coffee pots and other beverage preparation devices.

Still another object is to so form the device that it can be used to advantage either in the home or in commercial establishments such as restaurants.

Yet another object, in one form of the invention, is to facilitate vertical adjustment of the filter bag to selected positions in one of which the bag may be immersed in hot water within the receptacle, and in another of which the bag will be positioned wholly above the receptacle to permit preparation of coffee by the drip process. In the first position, the filter bag permits tea to steep in a manner to produce maximum flavor in the prepared beverage.

Yet another object is to provide a novel means cooperating between the bag-supporting standard of the device and the filter bag frame, which means will permit the swift adjustment of the filter bag to the respective, adjusted positions thereof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a stand and filter made in accordance with the present invention; in which the filter has been shown in full and dotted lines in selected positions of adjustment in respect to a receptacle shown in full lines.

Fig. 2 is a top plan view of the construction shown in Fig. 1.

Fig. 3 is a greatly enlarged, fragmentary perspective view showing the connection of the filter frame to the standard.

Fig. 4 is an enlarged sectional view substantially on line 4—4 of Fig. 1, the filter frame being shown in dash-dotted lines in position to be released from the standard and in chain-dotted lines in a lowered position of adjustment.

Fig. 5 is a longitudinal sectional view on the same scale as Fig. 4, taken on line 5—5 of Fig. 4.

Fig. 6 is a top plan view of the filter means per se shown in full and dotted lines in its expanded and contracted positions respectively, the scale being slightly larger than that of Fig. 1.

Referring to the drawings in detail, in the form of the invention shown in Figs. 1–5 the device includes a flat, circular base plate $10^a$ elevated slightly above a supporting surface by short, cylindrical legs $12^a$, $12^a$, $13^a$. Four legs are provided, angularly spaced about the periphery of base plate 10 ninety degrees apart. Three of the legs are identical, being solidly formed and welded or otherwise fixedly attached to the underside of the base plate, these being the legs $12^a$. The fourth leg $13^a$ is also welded to the base plate, and is coaxially aligned with a vertically extending standard $14^a$ projecting upwardly from the base plate at the back of the base plate. The standard is formed as a forwardly opening channel member and is welded or otherwise fixedly connected to the base plate.

A beverage filter includes; a support ring $24^a$ formed of a slightly springable rod material, the ring being concentric with and elevated a substantial distance above the base plate $10^a$. Depending from the support ring is a conical liquid-pervious bag $26^a$ having a ring-receiving hem $28^a$ at its upper end. In this device, the single length of rod material used in forming the support ring has end portions 34 normally spaced apart as shown in Figs. 8 and 11. These project outwardly from the annular portion of the ring $24^a$, and at their outer ends merge into vertical, upwardly extending portions 36, which at their upper ends in turn merge into laterally, outwardly projecting extensions 38.

Medially between its ends, the length of rod material is formed with an elongated loop portion having an approximately semicircular bight $40^a$ merging at its ends into laterally spaced, normally parallel handle support portions $30^a$ which at their inner ends merge into the annular part of the support ring. Heat-insulative handles $32^a$ are mounted upon the handle support portions, and accordingly, by grasping both handles in one hand and exerting a squeezing pressure thereon, one may shift the portions $30^a$ toward each other as shown in dotted lines in Fig. 6. This is done against the inherent restraint of the resilient rod material.

When the handles move toward each other, the opposite sides of the annular bag-supporting portion of the ring are shifted inwardly toward each other and this in turn causes the lugs or extensions 38 to be moved inwardly to the dotted line positions shown in Fig. 6. The extensions in their retracted positions are also shown in dash-dotted lines in Fig. 4.

At the upper end of the standard there are formed transversely aligned openings 42 and at a suitable distance below the openings 42 the side walls of the standard are formed with transversely aligned openings 44.

One may thus attach the filter to the standard at the upper end of the standard, as shown in full lines in Fig. 1, by squeezing the handles to locate the lugs 38 in registration with the openings 42. The handles are then released, and the lugs 38 will spring into openings 42 as shown in full lines in Fig. 4. With the lugs so engaged, the vertical portions 36 will bear against the web or back wall of the standard $14^a$, causing the support ring to be supported upon the standard in a perfectly horizontal position, with its bag $26^a$ fully spaced from receptacle R.

In use, one need thereafter merely pour hot water from a pot or other suitable container into the filter bag 26ᵃ. The water will pass through the coffee, and will drip slowly into the receptacle R to provide the beverage. When the beverage has been fully prepared, the handles are again squeezed, causing the lugs to be retracted from openings 42, thus fully detaching the filter from the stand. The filter need merely be inverted and turned inside-out for the purpose of removing coffee grounds or other solids. The bag 26ᵃ can, of course, be designed to be removed from the supporting ring 24ᵃ when it has had its useful life, so that replacement of the bag with maximum ease can be had as necessary.

If one desires, the filter may be attached to the stand in the lower, dotted position of Fig. 1. This is done in the same manner as is used when the filter is attached to the upper extremity of the standard. In this position, the lower portion of the bag extends into the receptacle, so that the beverage may steep until it is of a desired strength. The device is thus well adapted to permit making of the beverage either by the drip or steeping process, and also by a combination of both of these methods.

The device shown and described is adapted for use not only by the drip method but also by the steeping or infusing method. In the latter method, the bag is positioned directly within the receptacle R, so that the liquid previously deposited in receptacle R may circulate through the bag until it is of the desired strength. This is particularly desirable in making tea, since the quality of the flavor is enhanced when the tea is permitted to steep in hot water for a suitable length of time. Further, the device can be made in any of various sizes, so as to be usable to advantage both in the home and in commercial establishments.

While I have illustrated and described the preferred embodiment of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A device of the kind described comprising a base for supporting a receptacle used for brewing a beverage, a standard extending uprightly from said base, said standard being of channel formation including back and side walls, said side walls having a first pair of opposed openings adjacent the top thereof and having a second pair of opposed openings substantially midway the top and bottom thereof, a resilient split ring for engaging the mouth of a flexible receptacle, to hold it open, said ring having end portions offset angularly from the plane of the body of the ring, said offset portions terminating in oppositely curved ends for selectively springing into one of the pairs of openings in the walls of the standard, said ring having an elongated loop portion opposite its ends, the sides of said loop portion being shiftable toward and away from each other to close and open the split end of the ring whereby said ring may be selectively mounted in either pair of opposed openings in the standard, and heat insulating handles on the sides of the loop.

References Cited in the file of this patent

UNITED STATES PATENTS

| | | |
|---|---|---|
| 611,498 | Lyon | Sept. 27, 1898 |
| 924,923 | Nungesser | June 15, 1909 |
| 931,564 | Carlisle | Aug. 17, 1909 |
| 960,451 | Vicary | June 7, 1910 |
| 1,683,786 | Long | Sept. 11, 1928 |
| 2,100,235 | Brown | Nov. 23, 1937 |
| 2,532,052 | Berman | Nov. 28, 1950 |